(12) United States Patent
Senda (10) Patent No.: US 7,778,725 B2
(45) Date of Patent: Aug. 17, 2010

(54) METHOD FOR ESTIMATING THERMAL DISPLACEMENT IN MACHINE TOOL

(75) Inventor: Harumitsu Senda, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 201 days.

(21) Appl. No.: 12/016,526

(22) Filed: Jan. 18, 2008

(65) Prior Publication Data

US 2008/0215178 A1 Sep. 4, 2008

(30) Foreign Application Priority Data

Jan. 29, 2007 (JP) ............................. 2007-018314

(51) Int. Cl.
- *G06F 19/00* (2006.01)
- *G01N 25/16* (2006.01)
- *G01N 25/00* (2006.01)
- *G01B 7/16* (2006.01)

(52) U.S. Cl. ...................... 700/175; 374/55; 374/56; 700/174

(58) Field of Classification Search ............... 700/175, 700/174; 374/55, 56
See application file for complete search history.

(56) References Cited

U.S. PATENT DOCUMENTS

| | | | | |
|---|---|---|---|---|
| 5,833,407 A | * | 11/1998 | Senda | ........................ 409/131 |
| 6,019,506 A | * | 2/2000 | Senda | ........................ 374/55 |
| 6,341,245 B1 | * | 1/2002 | Ueta et al. | ................... 700/194 |
| 6,456,896 B1 | * | 9/2002 | Ito et al. | ...................... 700/193 |
| 6,471,451 B2 | * | 10/2002 | Kojima et al. | ............... 409/131 |
| 6,681,583 B2 | * | 1/2004 | Taguchi | ........................ 62/133 |
| 7,245,983 B2 | * | 7/2007 | Suzuki et al. | ................ 700/177 |
| 2002/0038189 A1 | * | 3/2002 | Mizuguchi et al. | ............ 702/94 |
| 2005/0198944 A1 | * | 9/2005 | Saitoh et al. | ................... 60/295 |
| 2006/0089745 A1 | * | 4/2006 | Suzuki et al. | ................ 700/176 |

FOREIGN PATENT DOCUMENTS

| | | | |
|---|---|---|---|
| JP | 3151655 B2 | | 1/2001 |
| JP | 3422462 B2 | | 4/2003 |
| JP | 2004195594 A | * | 7/2004 |
| JP | 2004249402 A | * | 9/2004 |
| JP | 2005186216 A | * | 7/2005 |
| JP | 2006-015461 | | 1/2006 |
| JP | 2006015461 A | * | 1/2006 |
| JP | 2007015094 A | * | 1/2007 |

* cited by examiner

*Primary Examiner*—Albert DeCady
*Assistant Examiner*—Jason Lin
(74) *Attorney, Agent, or Firm*—Burr & Brown (57) ABSTRACT

After a thermal displacement correcting program has started, a temperature is measured with a temperature sensor in S1, then when a rotational speed of a spindle is changed during the measurement (S2), a counter starts (S3). Then in S4, from a preset relationship between the rotational speed of the spindle and a setting-equivalent heat value, a correction factor that is a difference in setting-equivalent heat value between before and after the change in rotational speed of the spindle is calculated. Subsequently, in S5, a temperature-equivalent heat value is calculated, and then in S6, a compensation amount is calculated from the correction factor and a time elapsed after the change in rotational speed of the spindle. In S7, an equivalent heat value for compensating a dead time is obtained based on the sum of them S8, an estimated calculation for thermal displacement conversion is performed, and a correction process by an NC unit is performed in S9.

2 Claims, 8 Drawing Sheets

METHOD FOR ESTIMATING THERMAL DISPLACEMENT IN MACHINE TOOL

This application claims the benefit of Japanese patent Application Number 2007-018314 filed on Jan. 29, 2007, the entirety of which is incorporated by reference.

BACKGROUND OF THE INVENTION

1. Field of the Invention

The present invention relates to a method for estimating a thermal displacement of a rotatable spindle in a machine tool such as a machining center.

2. Description of the Background Art

A machine tool generally has heat sources at different parts thereof (e.g., roller bearing for a spindle) in the nature of the machine, and heat generated by the heat sources is transmitted to various parts of the machine, which causes a thermal displacement of the machine body. As the thermal displacement of the machine body largely affects machining accuracy, a method for cooling heat generating parts, or a method for estimating a thermal displacement from machine body temperature information for correction has been conventionally widely employed.

As the latter method for estimating a thermal displacement, the Patent document 1 disclosed a method where a thermal displacement is accurately estimated in any operational condition in such a way that a heat value during rotation is calculated based on an observed temperature changes during a period from a transient state after rotational speed is changed to a steady state, and then the thermal displacement is calculated from the calculated value.

Further, Patent document 2 discloses a thermal displacement estimating calculation where a thermal displacement of a spindle is obtained while varying a factor in a thermal displacement estimating arithmetic expression depending on time or the number of corrections, such that time response of temperature becomes the same as that of thermal displacement in a transient state, in order to make an accurate correction in any operational condition. In relation to the above method, Patent document 3 discloses the use of a function for making the time response of temperature equal to that of thermal displacement in order to cancel a dead time (delay) in temperature measurement caused depending on a time constant or mounted position (distance from a heat source) of a temperature sensor.

[Patent document 1] Japanese Unexamined Patent Publication No. 2006-15461

[Patent document 2] Japanese patent No. 3151655

[Patent document 3] Japanese patent No. 3422462

SUMMARY OF THE INVENTION

However, in the conventional methods, the dead time (delay) is treated based on an assumption that the time response of thermal displacement is relatively similar to that of temperature change. For this reason, when the dead time in temperature measurement is long, an error might be observed in the estimated value if thermal displacement occurs at the very beginning of the transient state in a condition where the temperature change is not observed.

It is therefore an object of the present invention to provide a method capable of improving an estimate accuracy of the thermal displacement in a condition where the temperature change is not observed even though the thermal displacement occurs due to the dead time in temperature measurement caused by a time constant or mounted position of a temperature sensor.

In order to accomplish the above object, a first aspect of the invention is a method for estimating a thermal displacement in a machine tool, including the steps of: measuring and digitalizing a temperature changes in the machine tool by a sensor; performing an estimated calculation of a temperature-equivalent heat value based on the obtained temperature data; and estimating a thermal displacement of the spindle based on the temperature-equivalent heat value, wherein the calculation of the temperature-equivalent heat value is performed with use of a discrete value; and when a rotational speed of the spindle is changed, a difference in a setting-equivalent heat value between before and after the change in the rotational speed of the spindle is obtained from a preset relationship between the rotational speed of the spindle and the setting-equivalent heat value, a compensation amount is obtained from the difference and a time elapsed after the change in the rotational speed of the spindle, and the obtained compensation amount is added to the temperature-equivalent heat value.

In order to accomplish the above object, a second aspect of the invention is a method for estimating a thermal displacement in a machine tool, including the steps of: measuring and digitalizing a temperature changes in the machine tool by the sensor; and estimating the thermal displacement based on the obtained temperature data, wherein when the rotational speed of the spindle is changed, a difference in a setting-equivalent heat value between before and after the change in the rotational speed of the spindle is obtained from a preset relationship between the rotational speed of the spindle and the setting-equivalent heat value, a compensation amount is obtained from the difference and a time elapsed after the change in the rotational speed of the spindle, a transfer function of first-order lag element is applied to the compensation amount to calculate a compensation temperature, and the obtained compensation temperature is added to a measured temperature.

Now, the thermal displacement estimating method according the first aspect is described in detail based on the drawings.

Figure 1:
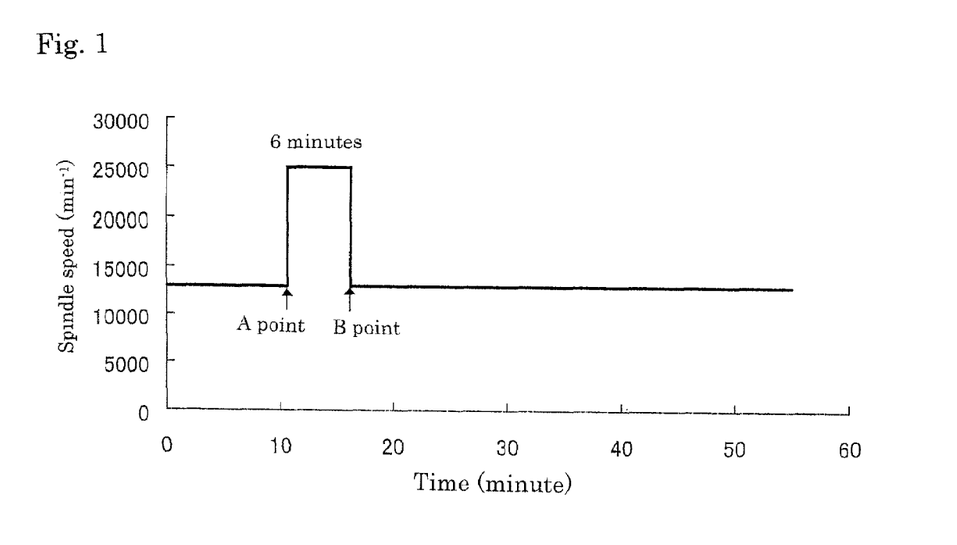
FIG. 1 is a characteristic diagram illustrating a time-dependent change in rotational speed of the spindle in a machining center.
Figure 2:
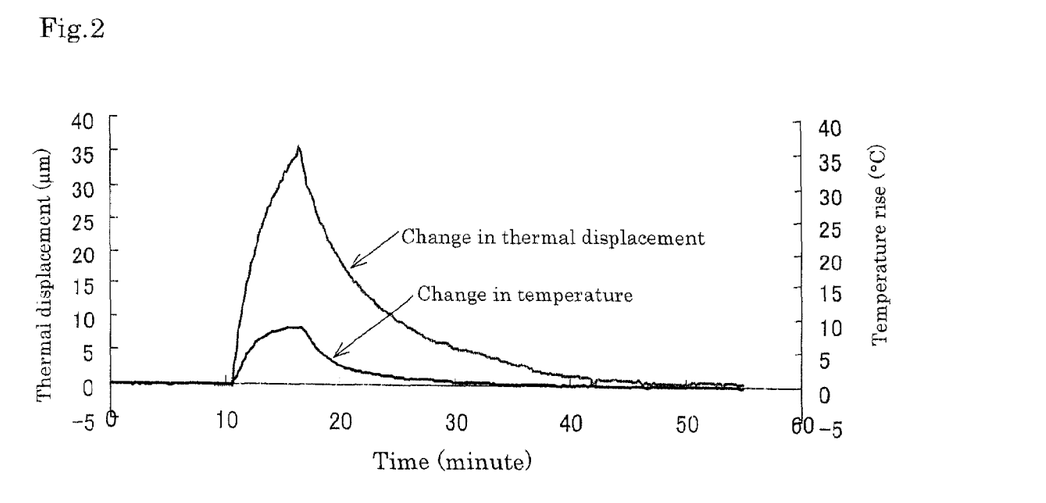
FIG. 2 is a characteristic diagram illustrating time-dependent changes in measured thermal displacement and temperature rise value of the spindle.
Figure 3:
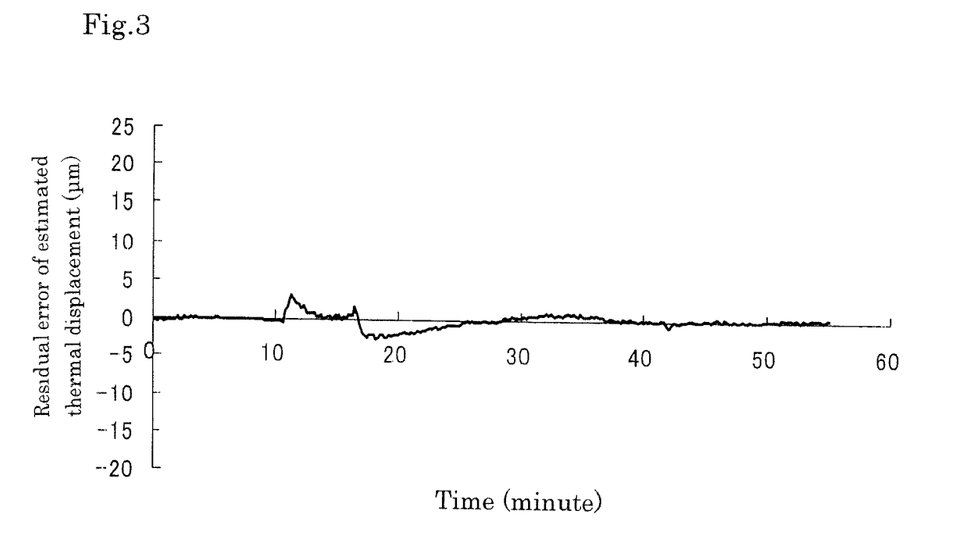
FIG. 3 is a characteristic diagram illustrating a residual error obtained by a conventional method in which a thermal displacement is estimated based on a temperature-equivalent heat value.

FIG. 1 illustrates a time-dependent change in rotational speed of a spindle in a machining center. In order to clarify features of the present invention, the diagram exemplifies the spindle speed of 13,000 $min^{-1}$ and 25,000 $min^{-1}$, which respectively form a steady state and a transient state. FIG. 2 illustrates time-dependent changes in a measured thermal displacement and a temperature rise value (value relative to a machine body temperature) of the spindle under an operating condition illustrated in FIG. 1. The thermal displacement was measured at intervals of 10 seconds with use of a non-contact type displacement sensor, and the temperature change value was measured with a temperature sensor placed near a spindle bearing. FIG. 3 illustrates a residual error between a thermal displacement estimated based on the conventional method and the measured thermal displacement illustrated in FIG. 2.

In the conventional estimating method, regardless of the rapid change from the steady state in an operating pattern illustrated in FIG. 1, an estimated calculation of a temperature-equivalent heat value is performed based on the temperature data to thereby estimate the thermal displacement.

Specifically, the thermal displacement estimated error illustrated in FIG. 3 is obtained based on Expressions 1' to 3' below in which specific factors are respectively applied to the following Expressions 1 to 3.

$$TX_n = TY_{n-1} + (TY_n - TY_{n-1})/\alpha_T \quad \text{Expression 1}$$

$TX_n$: nth temperature-equivalent heat value,
$TY_n$: nth temperature change,
$\alpha_T$: Response characteristic factor.

$$Y_n = Y_{n-1} + (X_n - Y_{n-1}) \cdot \alpha \quad \text{Expression 2}$$

$X_n$: nth temperature-estimated heat value,
$Y_n$: nth first-order lag response processing value,
$\alpha$: Response characteristic factor.

$$\text{Estimated thermal displacement} = K \cdot Y_n \quad \text{Expression 3}$$

K: Thermal displacement conversion factor ($\mu$m/° C.)

$$TX_n = TY_{n-1} + (TY_n - TY_{n-1})/0.91 \quad \text{Expression 1'}$$

$$Y_n = Y_{n-1} + (X_n \cdot Y_{n-1}) \cdot 0.038 \quad \text{Expression 2'}$$

$$\text{Estimated thermal displacement} = 5 \cdot Yn \quad \text{Expression 3'}$$

Figure 4:
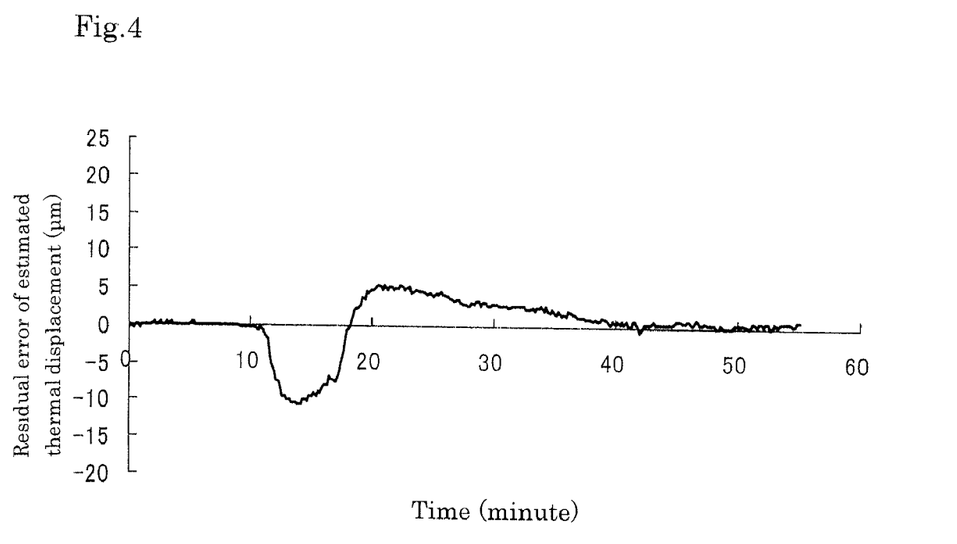
FIG. 4 is a characteristic diagram illustrating a residual error of estimated thermal displacement by temperature rise.
Figure 5:
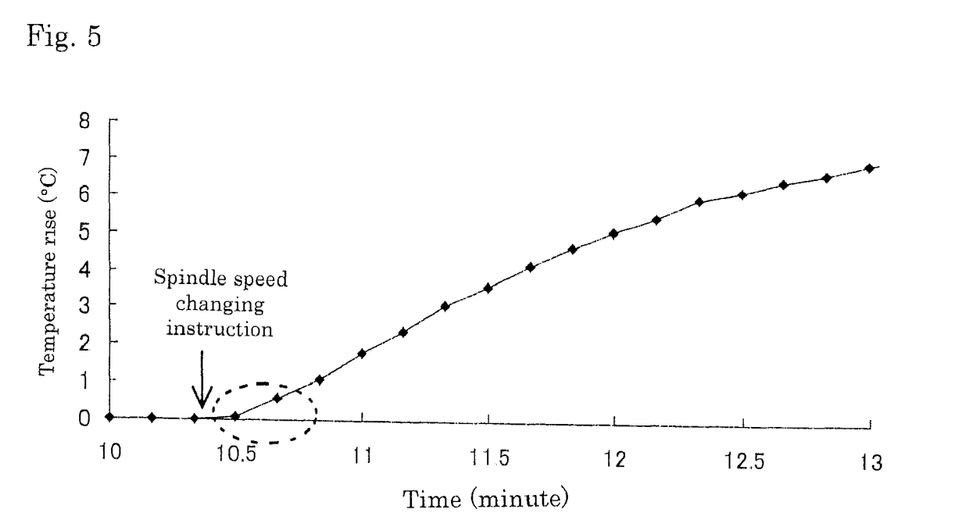
FIG. 5 is a characteristic diagram illustrating response of a change in measured temperature immediately after the change in rotational speed.
Figure 6:
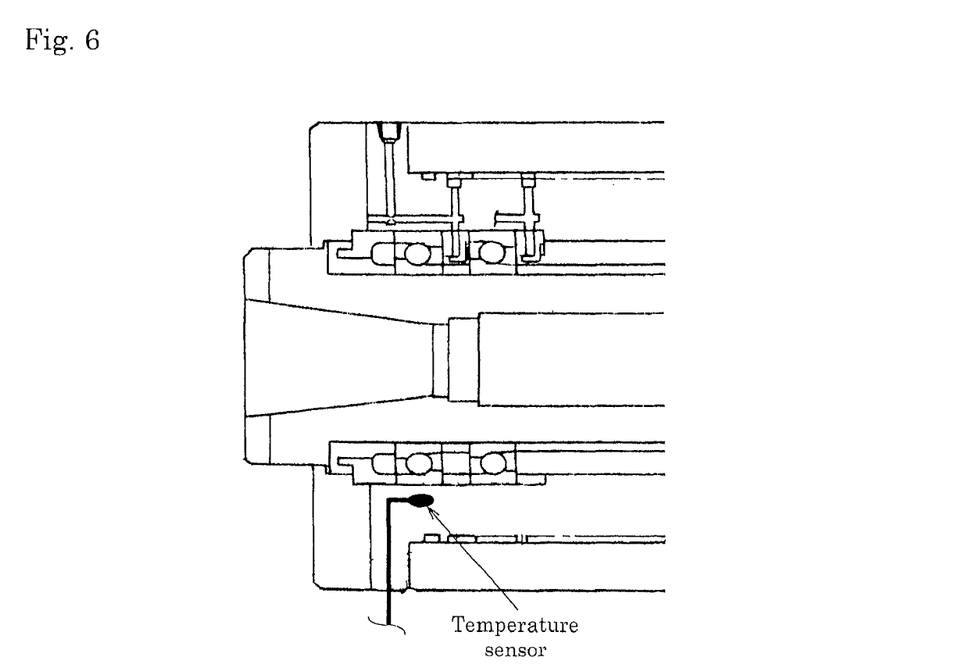
FIG. 6 is a detailed diagram of a spindle head, in which an attachment position of a temperature sensor is exemplified.

FIG. 4 illustrates a residual error between a thermal displacement estimated by temperature rise and the measured thermal displacement. As is clear from the comparison between FIGS. 4 and 3, in the conventional method, the temperature-equivalent heat value is estimated with Expression 1, and the thermal displacement is estimated with Expressions 2 and 3 based on the change of the heat value, i.e., the estimating method approximating the measured thermal displacement is employed. Therefore, the thermal displacement at the time of transition from the steady state to the transient state, between the transient states, or from the transient state to the steady state can be estimated with a high accuracy. However, as illustrated in FIG. 5, it turns out from the enlarged diagram of the change in measured temperature that a dead time exists immediately after the change in rotational speed (a portion indicated by the dashed line circle where the temperature change is delayed with respect to the rotation number changing instruction), and the portion adversely affects the thermal displacement estimation accuracy. The dead time is caused by a constant of response time and an attachment position of the temperature sensor (distance from the bearing acting as a heat source to the sensor, see FIG. 6).

Accordingly, use of an arithmetic expression accommodating the dead time in the temperature measurement allows the thermal displacement to be estimated with a higher accuracy. The temperature-equivalent heat value calculated from the temperature measurement result of FIG. 2 with use of Expression 1 is now illustrated in FIG. 7. It turns out from the diagram that a response of a first-order lag element appears in a rise part after the change in rotational speed, which is a cause of the estimated error immediately after the change in rotational speed.

Figure 7:
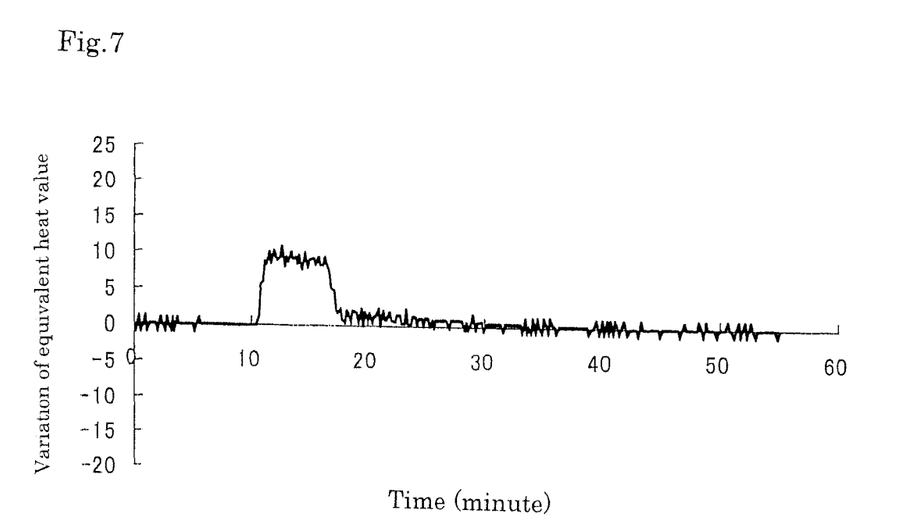
FIG. 7 is a characteristic diagram illustrating the temperature-equivalent heat value calculated from the measured temperature.

For this reason, in the present invention, based on an assumption that the cause is a first-order lag element defined by the distance and structure between the heat generating position and the temperature sensor at a position of temperature measurement, a compensation amount is added after the change in rotational speed such that the change in temperature-equivalent heat value of FIG. 7 forms into a rectangular wave. The compensation amount is expressed by Expression 4.

$$LT_n = As \cdot \exp(-t/\beta) \quad \text{Expression 4}$$

$LT_n$: nth compensation amount after change in rotational speed,
As: Correction factor
t: Time elapsed after change in rotational speed,
$\beta$: Constant at response time In addition, when $LT_n$ becomes small, the calculation of the compensation amount may be concluded. In particular, when a result obtained by multiplying the $LT_n$ value by K (thermal displacement conversion factor) in Expression 3 is small enough with respect to a desirable machined surface roughness, the calculation is concluded.

In general, with increasing the rotational speed, the heat value increases. For this reason, a relationship between the rotational speed of the spindle and an equivalent heat value (setting-equivalent heat value) is experimentally obtained, and a correction factor as the difference between before and after the change in rotational speed of the spindle is obtained with the following Expression 5.

$$As = C \cdot (Ns^\gamma - Nos^\gamma) \quad \text{Expression 5}$$

As: Correction factor after change in rotational speed
C, $\gamma$: Approximation factor
Ns: Instructed rotational speed of the spindle
Nos: Rotational speed before change Alternatively, it is also possible to represent the relationship between the rotational speed of the spindle and setting equivalent heat value as a comparison table, and further when an equivalent rotational speed is instructed, it is possible to obtain the heat value by interpolation based on the rotational speed close to the instructed speed.

Figure 8:
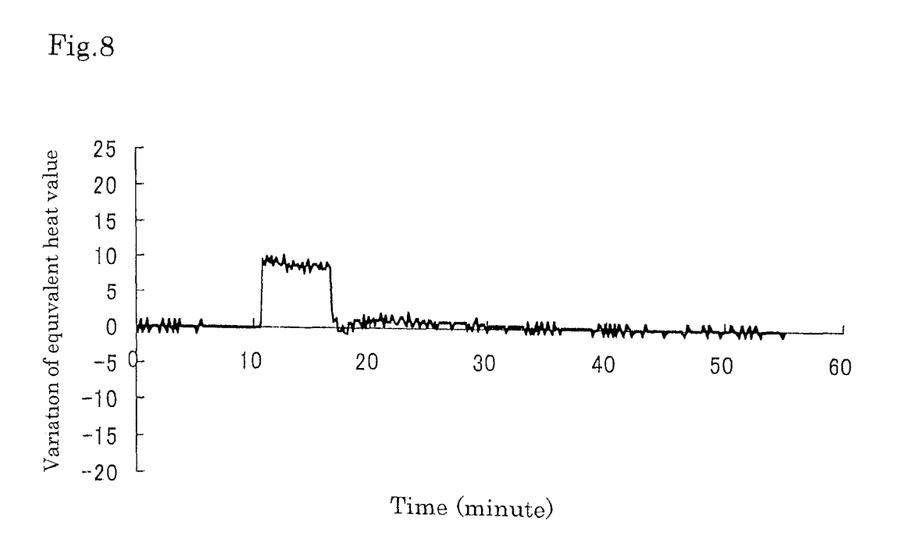
FIG. 8 is a characteristic diagram illustrating an equivalent heat for compensating dead time according to the method of the present invention.

FIG. 8 illustrates a result of a heat value equivalent to a dead time compensation calculated in such a way that the compensation amount of the present invention is obtained with a following Expression 4', which is then added to the temperature-equivalent heat value obtained with Expression 1'.

$$LT_n = 5 \cdot \exp(-t/0.6) \quad \text{Expression 4'}$$

Figure 9:
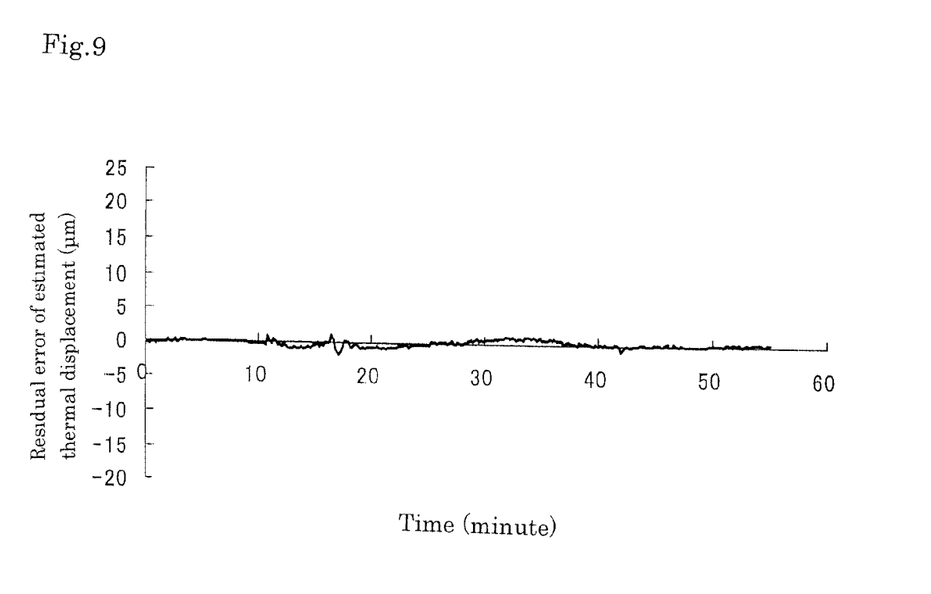
FIG. 9 is a characteristic diagram illustrating a residual error of estimated thermal displacement according to the method of the present invention.

FIG. 9 illustrates a residual error between a thermal displacement calculated based on the change in equivalent heat value (compensation-equivalent heat value) after the dead time compensation, which is estimated with the method of the present invention, and the measured thermal displacement. As is clear from the comparison between FIGS. 9 and 3, the method of the present invention enables the estimated error to be reduced to one half or less of the conventional one.

Next, the thermal displacement estimating method according to the second aspect is described.

The method is to obtain the thermal displacement of the spindle while varying a factor in the thermal displacement estimating arithmetic expression depending on the rotational speed, and time or the number of corrections until a state returns to be steady from the transient state after the change in rotational speed such that time response of temperature becomes the same as that of thermal displacement in the transient state.

Figure 10:
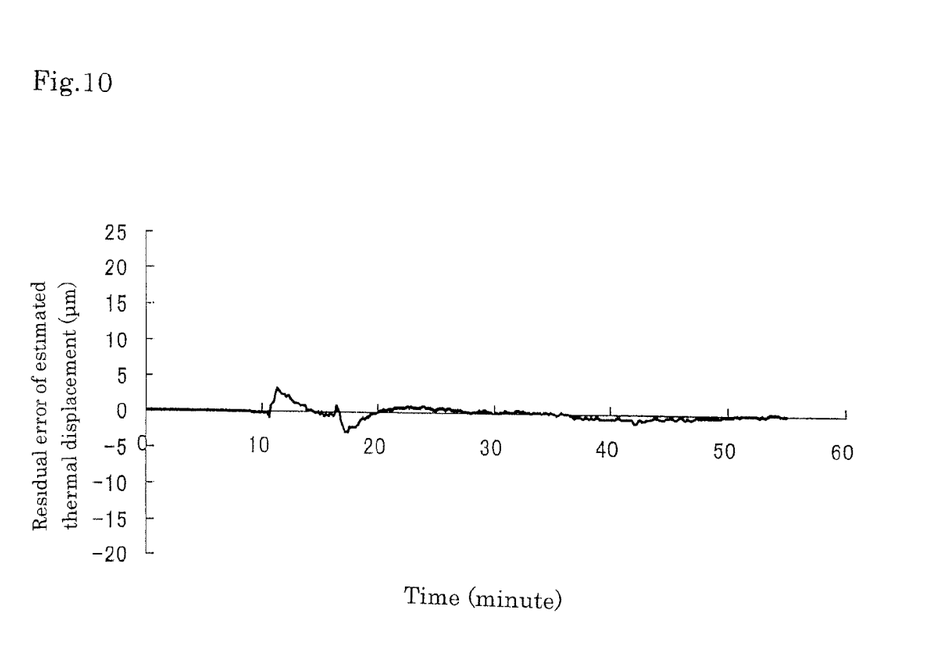
FIG. 10 is a characteristic diagram illustrating a residual error of estimated thermal displacement according to a conventional method.

In the operating pattern illustrated in FIG. 1, in order to accurately obtain the thermal displacement in the transient state, a number counter is first started at a point A at which the steady state transits to the transient state. Then, an intermediate value for thermal displacement estimation is calculated with use of the following Expression 6, and subsequently an estimated calculation of the thermal displacement is performed with use of Expression 3. At this time, the rotational speed of the spindle is changed from the steady state of thermal displacement, and a difference amount in Expression 8 is small, so that it is not necessary to include it to a temperature for input calculation in Expression 6. Subsequently, when the rotational speed of the spindle is changed at a point B, the number counter is once reset and then restarted. At this time, the rotational speed is changed from the transient state of thermal displacement, so that the temperature for input calculation accommodating the difference amount in Expressions 7 and 8 is substituted to Expression 6 to calculate the intermediate value for thermal displacement estimation. Then, an estimated calculation of the thermal displacement is performed with use of Expression 3. In particular, a thermal displacement estimated error illustrated in FIG. 10 is obtained with Expressions 6' to 8' below in which following Expressions 6 to 8 are brought into practical forms.

$$Y_{tn} = Y_{tn-1} + (X_{tn} - Y_{tn-1}) \cdot f(n, T(n)) \quad \text{Expression 6}$$

$X_{tn}$: nth temperature for input calculation
$Y_{tn}$: nth intermediate value for thermal displacement estimation
$f(n, T(n))$: Function $$\text{Temperature for input calculation} = \text{Measured temperature} - \text{Difference amount} \cdot \exp(-t/T tmp) \quad \text{Expression 7}$$

$$\text{Difference amount} = \text{Temperature immediately before change in rotational speed} - \text{Intermediate value for thermal displacement estimation immediately before change in rotational speed} \quad \text{Expression 8}$$

t: Time elapsed since change in rotational speed
Ttmp: Temperature time constant $$Y_{tn} = Y_{tn-1} + (X_{tn} - Y_{tn-1}) \cdot [1 + 21\{1 - \exp(-t/280)\}] \quad \text{Expression 6'}$$

$$\text{Temperature for input calculation} = \text{Measured temperature} - \text{Difference amount} \cdot \exp(-t/240) \quad \text{Expression 7'}$$

$$\text{Difference amount at point B} = 1.5 \quad \text{Expression 8'}$$

Figure 11:
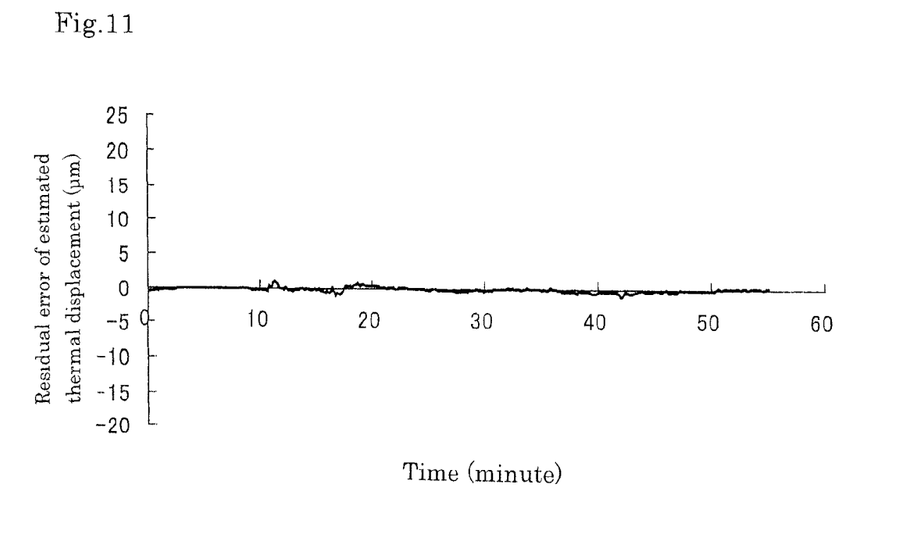
FIG. 11 is a characteristic diagram illustrating a residual error of estimated thermal displacement according to the method of the present invention.

In this method, the thermal displacement is estimated from the measured temperature, so that the measurement dead time can be compensated by calculating, based on the result of the response of the first-order lag element, the response delay caused by the attachment position and the temperature sensor with use of Expression 2 with respect to the compensation value for the equivalent heat value calculated with Expression 4, and adding the obtained result to the temperature for input calculation as a compensation temperature. FIG. 11 illustrates a residual error of the measured thermal displacement based on the method of the present invention, As is clear from the comparison between FIGS. 11 and 3, the method of the present invention enables the estimated error to be reduced to one half or less of the conventional one.

According to the present invention, the dead time in temperature measurement caused by the time constant and attachment position of the temperature sensor can be compensated. Accordingly, an excellent effect can be expected particularly when a thermal displacement phenomenon appears before the observation of temperature change. Further, an excellent effect capable of improving an estimation accuracy of a thermal displacement is obtained. As a result, it is not necessary to attach the temperature sensor to be close to the heat source, so that degree of design freedom increases.

DETAILED DESCRIPTION OF THE INVENTION

Embodiments of the present invention will hereinafter be described based on the drawings.

Figure 12:
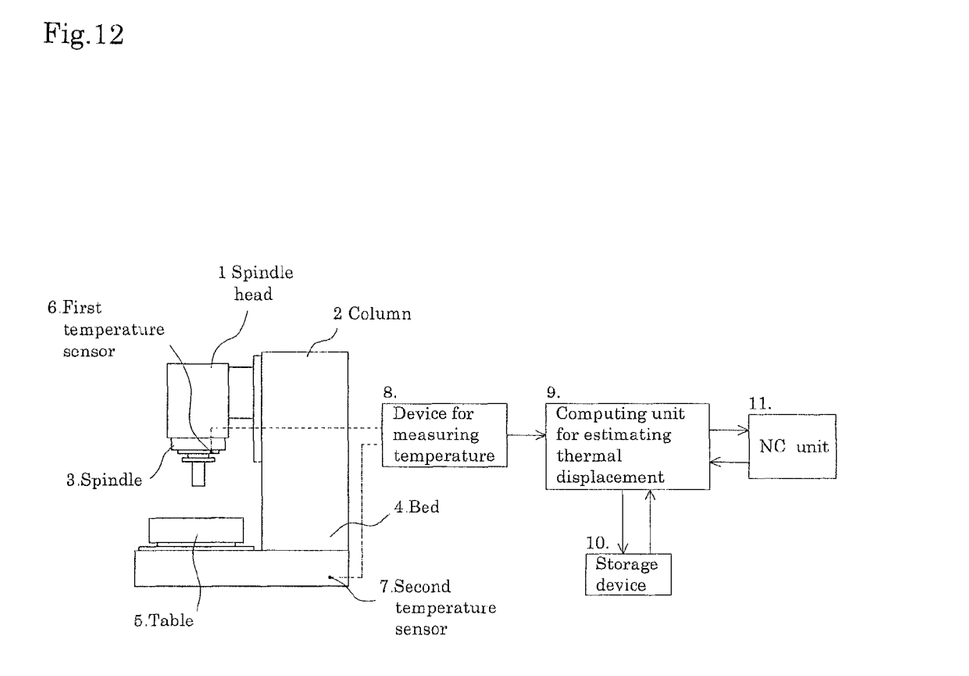
FIG. 12 is a schematic diagram illustrating a thermal displacement correcting system of a vertical machining center in which the method of the present invention is performed.

FIG. 12 illustrates a thermal displacement correcting system in a vertical machining center; a system similar to this may be applied to a horizontal machining center. The machining center substantially includes a spindle head 1, a column 2, a spindle 3, a bed 4, a moving table 5, etc., as is known. Near the spindle head 3, a first temperature sensor 6 for measuring a heat generation temperature of the spindle 3 is attached (see FIG. 6). Further, a second temperature sensor 7 for measuring a reference temperature is attached to the bed 4.

A device for measuring temperature 8 converts analog signals received from the respective temperature sensors 6 and 7 into digital signals, and outputs the digitalized temperature data to a computing unit for estimating thermal displacement 9. A storage device 10 preliminarily stores correcting parameters, parameters for the rotational speed of the spindle and setting-equivalent heat value. The computing unit for estimating thermal displacement 9 estimates a thermal displacement based on the temperature data and the correcting parameters to calculate a correction value. Subsequently, an NC unit 11 performs a positional correction in a conventional manner based on the correction value.

Figure 13:
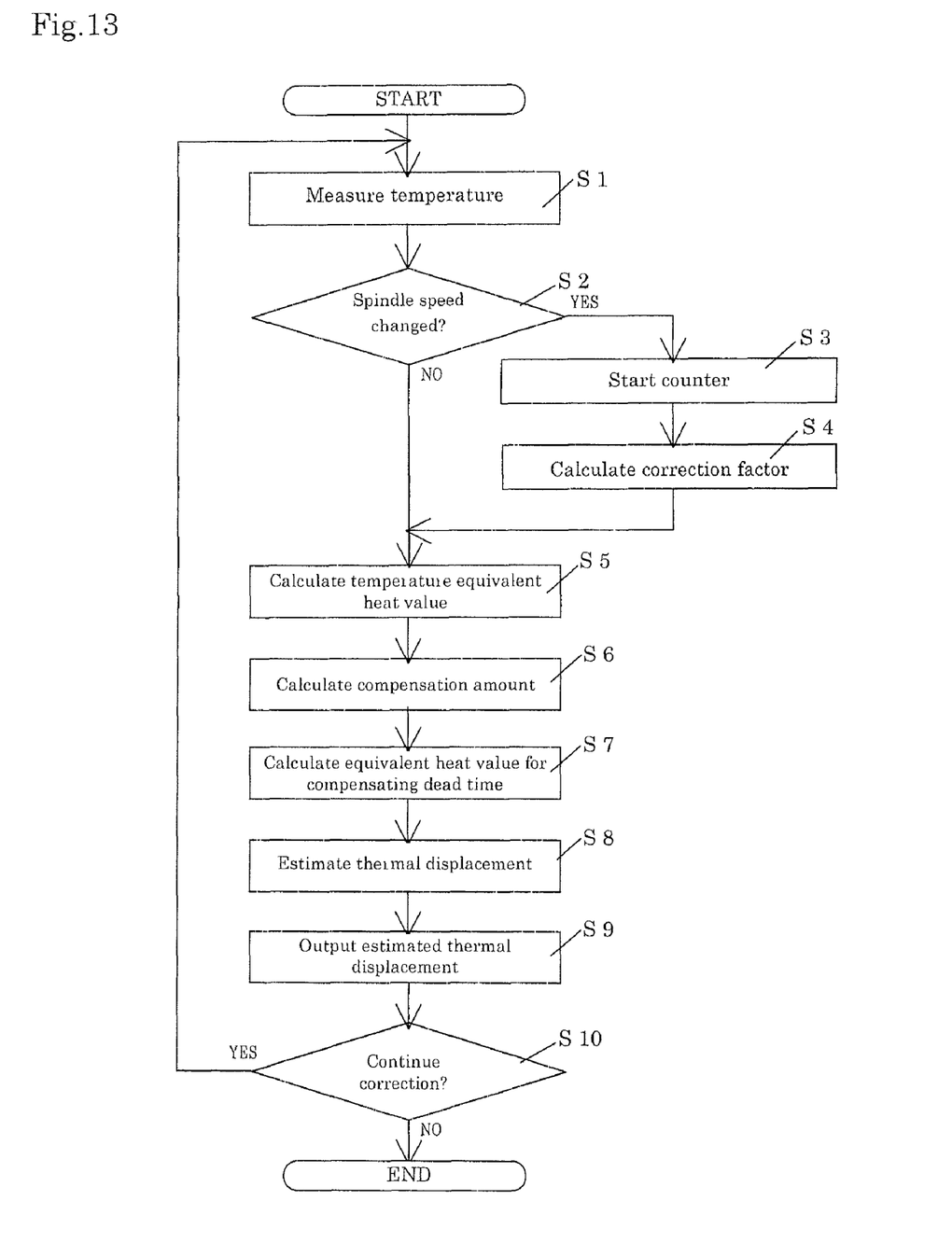
FIG. 13 is a flowchart illustrating a method for estimating and correcting the thermal displacement based on an equivalent heat value in the machining center.

FIG. 13 is a flowchart for estimating a thermal displacement in the above machining center based on the equivalent heat value during rotation to perform a correction and is equivalent to the thermal displacement estimating method according to the first aspect.

After a thermal displacement correcting program has started, temperature measurements are performed with the temperature sensors 6 and 7 (Step 1: hereinafter simply referred to as "S1"). When the rotational speed of the spindle 3 is changed during the measurements (S2), a counter starts (S3), and then a correction factor after the change in rotational speed which is equivalent to the rotational speed, is calculated from Expression 5 in S4.

Subsequently, in S5, the temperature-equivalent heat value based on Expression 1 is calculated, and then in S6, the compensation amount based on Expression 4 is calculated. In S7, the equivalent heat value for compensating dead time is obtained based on the sum of them. In addition, when the compensation amount becomes small, the compensation amount may not be calculated.

After these steps, an estimated calculation for thermal displacement conversion is performed with Expressions 2 and 3 in S8, and then in S9, the NC unit 11 is made to perform the correction process. If the correction needs to be continuously performed, the flow returns to S1 (S10).

As described above, according to the thermal displacement estimating method in the above embodiment, the compensation for the dead time in temperature measurements caused by time constants and attachment positions of the temperature sensors 6 and 7 allows an excellent effect to be expected. Particularly, when a thermal displacement phenomenon appears before the observation of temperature change, so that an excellent effect capable of improving an estimation accuracy of the thermal displacement is obtained. Therefore, it is not necessary to attach the temperature sensors 6 and 7 too close to the heat sources, resulting that degree of design freedom increases.

Figure 14:
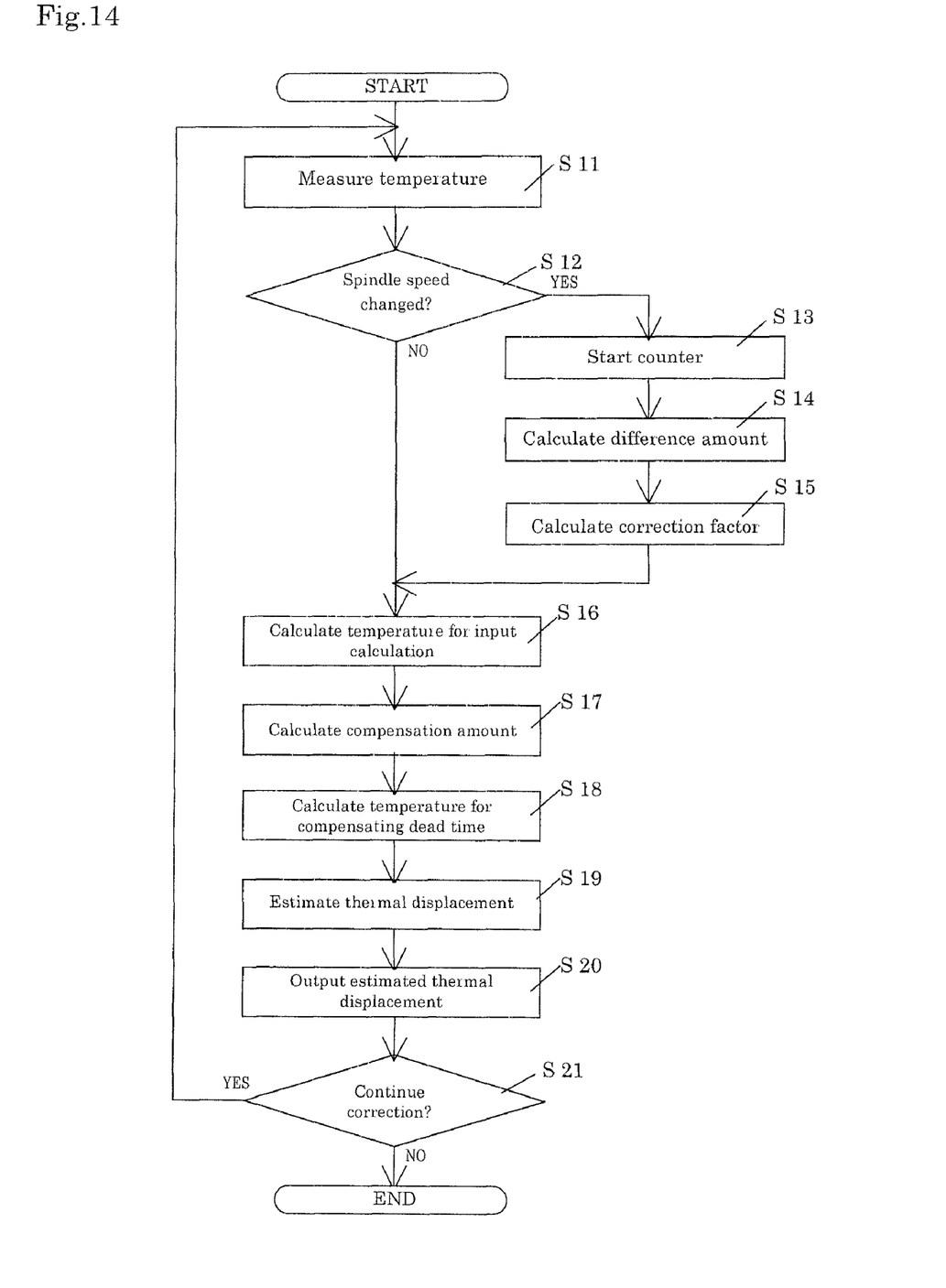
FIG. 14 is a flowchart illustrating a method for estimating and correcting the thermal displacement based on a temperature in the machining center.

Next, another embodiment is described based on a flowchart illustrated in FIG. 14, in which the thermal displacement is estimated from a temperature and is corrected in accordance with the thermal displacement estimating method according the second aspect.

After the thermal displacement correcting program has been started, temperature measurements are performed with the temperature sensors 6 and 7 (S11). When the rotational speed of the spindle 3 is changed during the measurements (S12), the counter starts in S13. Then, the difference amount is calculated based on Expression 8 in S14, and in S15, the correction factor after the change in rotational speed, which is equivalent to the rotational speed, is calculated from Expression 5.

Subsequently, in S16, an difference adjustment amount based on an elapsed time, which is equivalent to the difference amount based on Expression 7, and a measured temperature are added up to calculate the temperature for input calculation. In addition, the difference adjustment amount is not calculated when it becomes small to an extent of not affecting the calculation of an intermediate value for estimation Yn.

After that, in S17, the compensation amount for a heat value is calculated based on Expression 4, and in the subsequent step S18, the transfer function of the first-order lag element due to the attachment positions is performed to obtain a compensation temperature, which is then added to the temperature for input calculation to obtain a dead time compensation temperature. Subsequently, in S19, after the obtained dead time compensation temperature has been substituted to Expression 6 as the temperature for input calculation to calculate an intermediate value for thermal displacement estimation, the estimated calculation for thermal displacement conversion is performed with use of Expression 3, and in S20, the NC unit 11 is made to perform the correction process. If the correction needs to be continuously performed, the flow returns to S11 (S21).

In addition, when the compensation amount becomes small, S17 and S18 may be bypassed.

As described above, also in the thermal displacement estimating method in the above embodiment, the compensation for the dead time in temperature measurements caused depending on the time constants and attachment positions of the temperature sensors 6 and 7 allows the excellent effect to be expected particularly when the thermal displacement phenomenon appears before the observation of temperature change, so that the excellent effect capable of improving the estimation accuracy of the thermal displacement is obtained. As a result, it is not necessary to attach the temperature sensors 6 and 7 to be close to the heat sources, resulting that degree of design freedom increases.

What is claimed is:

1. A method for estimating a thermal displacement in a machine tool, comprising the steps of: measuring and digitizing a temperature change in the machine tool; calculating a temperature-equivalent heat value based on the measured temperature data; and estimating the thermal displacement of a spindle based on the temperature-equivalent heat value, wherein the calculation of the temperature-equivalent heat value is performed with use of a discrete value; and when a rotational speed of the spindle is changed, a difference in a setting-equivalent heat value between before and after the change in the rotational speed of the spindle is obtained from a preset relationship between the rotational speed of the spindle and the setting-equivalent heat value, a compensation amount is obtained from the difference and a time elapsed after the change in the rotational speed of the spindle, and the obtained compensation amount is added to the temperature-equivalent heat value.

2. A method for estimating a thermal displacement in a machine tool, comprising the steps of: measuring and digitizing a temperature change in the machine tool; and estimating a thermal displacement based on the obtained temperature data, wherein when a rotational speed of a spindle is changed, a difference in a setting-equivalent heat value between before and after the change in the rotational speed of the spindle is obtained from a preset relationship between the rotational speed of the spindle and the setting-equivalent heat value, a compensation amount is obtained from the difference and a time elapsed after the change in the rotational speed of the spindle, a transfer function of a first-order lag element is applied to the compensation amount to calculate a compensation temperature, and the obtained compensation temperature is added to a measured temperature.

* * * * *